United States Patent [19]
Terry

[11] Patent Number: 5,213,751
[45] Date of Patent: May 25, 1993

[54] METHOD OF PRODUCING A FELTED POROUS POLYCHLOROPRENE LATEX FOAM

[75] Inventor: Betty R. Terry, Weston, Conn.

[73] Assignee: Pitney Bowes Inc., Stamford, Conn.

[21] Appl. No.: 797,676

[22] Filed: Nov. 25, 1991

[51] Int. Cl.$^5$ .............................................. B29C 67/20
[52] U.S. Cl. ...................................... 264/321; 521/918
[58] Field of Search ...................... 264/321; 118/264; 101/333, 401.1; 521/918

[56] References Cited

U.S. PATENT DOCUMENTS

| | | | |
|---|---|---|---|
| 3,406,235 | 10/1968 | Trogdon et al. | 264/321 |
| 3,523,996 | 8/1970 | Kordiak | 264/321 |
| 3,971,315 | 7/1976 | Hansen | 101/401.1 |
| 3,987,137 | 10/1976 | Neumann et al. | 101/333 |
| 4,100,853 | 7/1978 | Clancy et al. | 264/50 |
| 4,226,886 | 10/1980 | Lakes | 264/45.9 |
| 4,226,911 | 10/1980 | Haren | 428/375 |
| 4,228,076 | 10/1980 | Pettingell | 264/321 |
| 4,336,767 | 6/1982 | Hiroshi | 118/264 |
| 4,358,505 | 11/1982 | Narumiya et al. | 264/26 |
| 4,562,112 | 12/1985 | Lee et al. | 264/321 |
| 5,006,404 | 4/1991 | Terry | 428/316 |
| 5,049,432 | 9/1991 | Ooms et al. | 101/333 |
| 5,104,908 | 4/1992 | Allred et al. | 521/150 |
| 5,132,170 | 7/1992 | Terry | 428/316.6 |

FOREIGN PATENT DOCUMENTS 1578722 11/1980 United Kingdom ............... 101/333

Primary Examiner—Allan R. Kuhns
Attorney, Agent, or Firm—Peter Vrahotes; Melvin J. Scolnick

[57] ABSTRACT

A method of felting porous polychloroprene latex foam to obtain desired properties. Such felting renders the finished foam suitable for controlled ink flow required for printing purposes. The felting is accomplished by reducing the volume of the porous polychloroprene latex foam and heating at a temperature of 400° to 460° F. for five to ten minutes.

2 Claims, 2 Drawing Sheets

METHOD OF PRODUCING A FELTED POROUS POLYCHLOROPRENE LATEX FOAM

COPENDING APPLICATIONS

Attention is directed to concurrently filed patent application entitled Method of Shaping and Felting Open Cell Polychloroprene Latex Foam by Donald R. Allred and William S. Moller issued as U.S. Pat. No. 5,104,908, Method of Felting Open Cell Polychloroprene Latex Foam in Reduced Time by Donald R. Allred, Ser. No. 797,677 and Rechargeable Inking Pad by Betty R. Terry, U.S. Pat. No. 5,132,170.

BACKGROUND OF THE INVENTION

In the printing industry, there are generally two types of inks, dispersion inks and solution inks. Dispersion inks have been widely used throughout the years because they more easily can be formulated. The primary disadvantage of dispersion inks is that their components tend to settle and, as a result, the inks must be agitated on occasion. Although solution inks do not have a settling problem, they are more difficult to produce. Recently, strides have been made in the capability of producing solution inks, but such inks have been found to be incompatible with the systems that are used to apply such inks. For example, in the printhead of a postage meter, an inking pad or roller, hereafter collectively referred to as inking member, will contact the printhead to transfer ink thereto and the inking member will be removed from the print head so that the inked print head can contact a mailpiece to print an indicia.

There are also two general types of inking members, rechargeable inking members and self containing inking members. In developing solution inks, it has been found that inking members that are acceptable for use with dispersion inks simply are not efficient when used with solution inks. This is because inking members suitable for dispersion inks have pores that are too large. Such large pore sizes are required to allow dispersed particles to be distributed through the inking member. Additionally, typical inking members for dispersion inks were found to be incompatible with polyglycols, a component of contemporary solution inks. Consequently, it has become evident that if the benefits offered by solution inks are to be realized, inking members must be developed that will enhance the use of such inks.

SUMMARY OF THE INVENTION

A rechargeable printing member has been formulated that is compatible with solution inks. The ink member consists of three layers: a first layer of microporous polyethylene that contacts a print head to transfer ink thereto, a second layer of fusible web adhesive, and a third layer of felted porous polychloroprene latex foam which serves as a reservoir layer for ink. With such an inking member, one obtains high quality indicia printing, excellent compatibility with solution inks, durability, and a high edge acuity.

Having the layer of porous polychloroprene latex foam felted was thought to offer particular advantages; however, no prior method of felting such a material was known. In fact, felting of polychloroprene was deemed to be unavailable because of the high resiliency and lack of compression set. For this reason, a method was developed for felting porous polychloroprene latex foam which involves placing the material under pressure then heating between 400° to 460° F. for a period of five to ten minutes.

DETAILED DESCRIPTION OF THE PREFERRED EMBODIMENT

Figure 1:
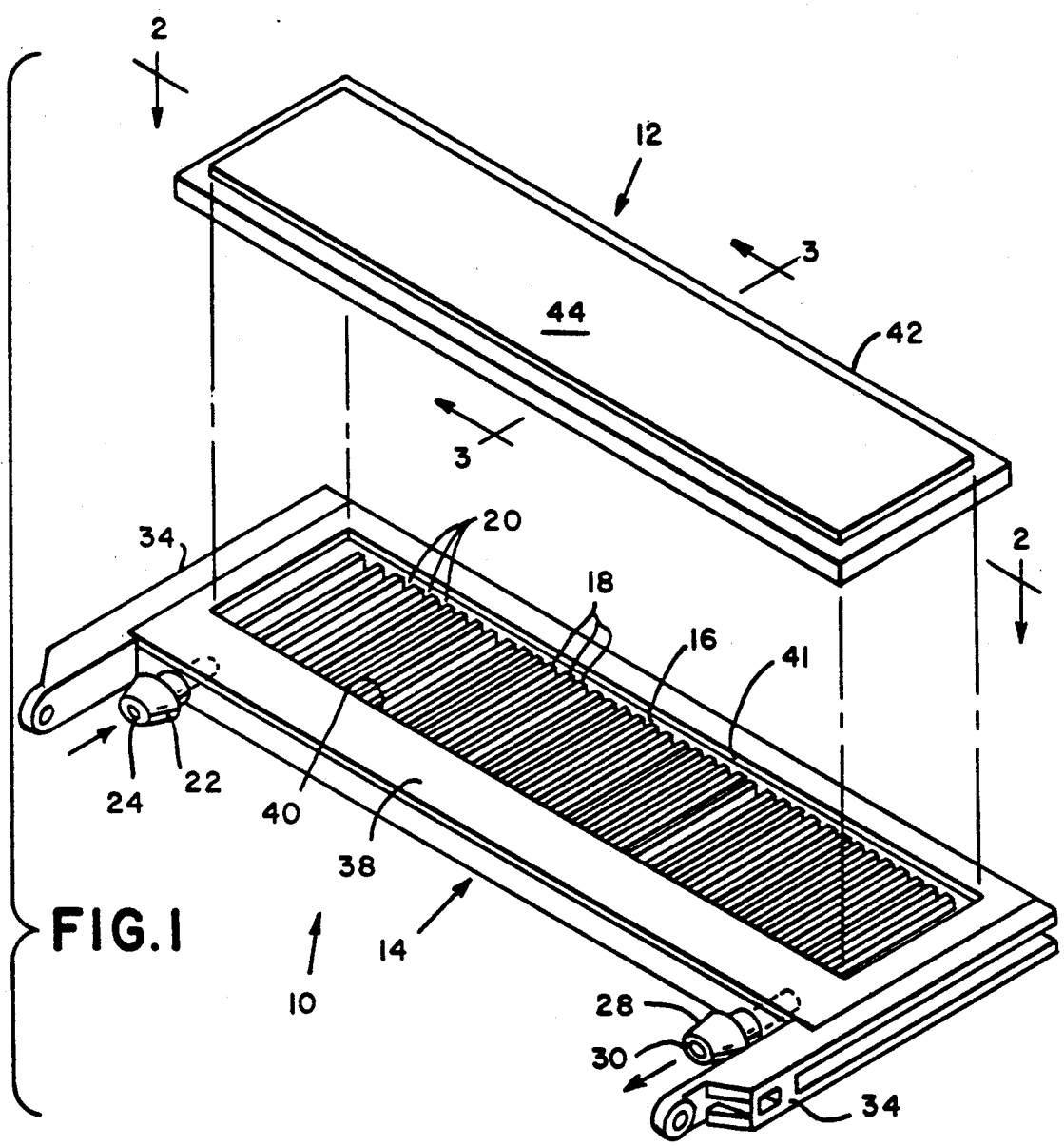
FIG. 1 is a perspective, partially exploded view of an inking member made in accordance with the instant invention and the environment in which such an inking member is used.
Figure 2:
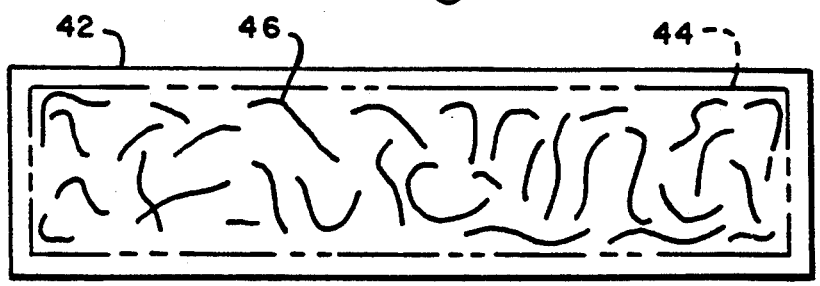
FIG. 2 is a plan view of the inking member shown in FIG. 1 taken along the lines 2—2.
Figure 3:
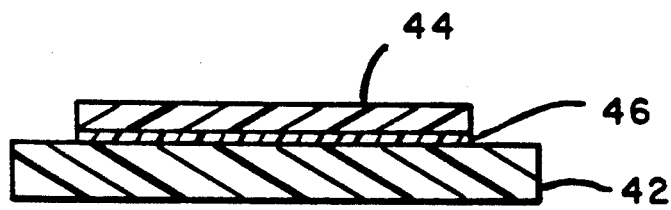
FIG. 3 is a cross sectional view of the inking member shown in FIG. 1.

A portion of an inking system in which the present invention can be used is shown generally at 10 that includes an inking member 12. A tray 14 receives the inking member as will be described in greater detail hereafter. Inking systems 10 of the type in which the invention can be practiced are generally known, see for example U.S. Pat. No. 4,945,831, and will, therefore, not be described in detail. Although the invention is described as it applies to an inking pad, it will be appropriate that the invention applies equally as well to inking rollers without departing from the invention and the term inking member is intended to include inking pads, inking rollers or any other convenient forms.

The tray 14 has an ink distribution chamber 16 that has a plurality of laterally extending ribs 18 that form channels 20 therebetween. The tray 14 has an inlet nozzle 22 having a central opening 24 that is confluent with the ink distribution chamber 16 whereby ink can be supplied to the chamber by attaching a tube (not shown) to the nozzle 22 with the tube being attached to an ink supply (not shown). Optionally, an outlet ink nozzle 28 can be supplied to the tray 14 with the outlet ink nozzle having a central opening 30 therein that is confluent with the ink distribution chamber 16. A tube (not shown) can be attached to the outlet nozzle 28 thereby allowing ink to be circulated through the ink distribution chamber 16. Also, with the presence of the inlet nozzle 22 and outlet nozzle 28 the ink distribution chamber can be cleaned with any appropriate cleaning fluid as required.

A pair of arms 34 located and attached to opposite ends of the tray 14 provide support for movement of the tray. A plate 38 having a central opening 40 therein is attached to the tray 14 and the central opening forms a part of the ink distribution chamber 16. A frame 41 is formed at the inner perimeter of the plate 38 and overhangs the ink distribution chamber 16 so that a portion of the inking member 12 is received between the frame and the chamber whereas the central portion of the inking member is exposed. Much of what has been shown and described thus far has been disclosed in U.S. Pat. No. 4,945,831, which also discloses an inker module in which the inking member 12 of the instant invention can be used. The manner in which the ink distribution chamber 16 is supplied ink and the manner in which the ink member 12 contacts a printhead is described in U.S. Pat. No. 4,945,831 and will not be described herein as the same does not form part of the instant invention.

The inking member 12 includes a first, or lower porous, layer 42, an upper, or second, porous layer 44 and an adhesive 46 therebetween to secure the first layer to the second layer. The adhesive 46 is applied in the form of filaments that accumulate and cross over one another to form openings between the filaments. The thusly applied adhesive 46 creates a random non woven opening pattern that allows free flow of ink from the first layer 42 that serves as an ink reservoir to the second layer 44 that serves as a metering member. It will be noted that the first layer 42 is somewhat larger than the second layer 44 and that the frame 41 fits over the exposed portion of the first layer 42 and the second layer 44 is received in the opening 40 when the inking member 12 is received within the ink distribution chamber 16.

The first, or lower, layer 42 is preferably made of porous, also referred to as open cell, polychloroprene latex foam material having a pore size of 200 to 500 microns and serves as a reservoir of ink. Preferably, the polychloroprene latex foam material is felted and a manner in which it can be felted will be described hereinafter. The adhesive material that binds the two layers 42, 44 is a fusible web adhesive such as polyamide that is available from Freudenberg Nonwovens, Limited Partnership of Germany under the tradename PELLON. The second layer is a microporous sintered polyethylene having a pore size of about 10 to 20 microns. This second layer serves to meter ink to a print head upon contact therewith.

Figure 4:
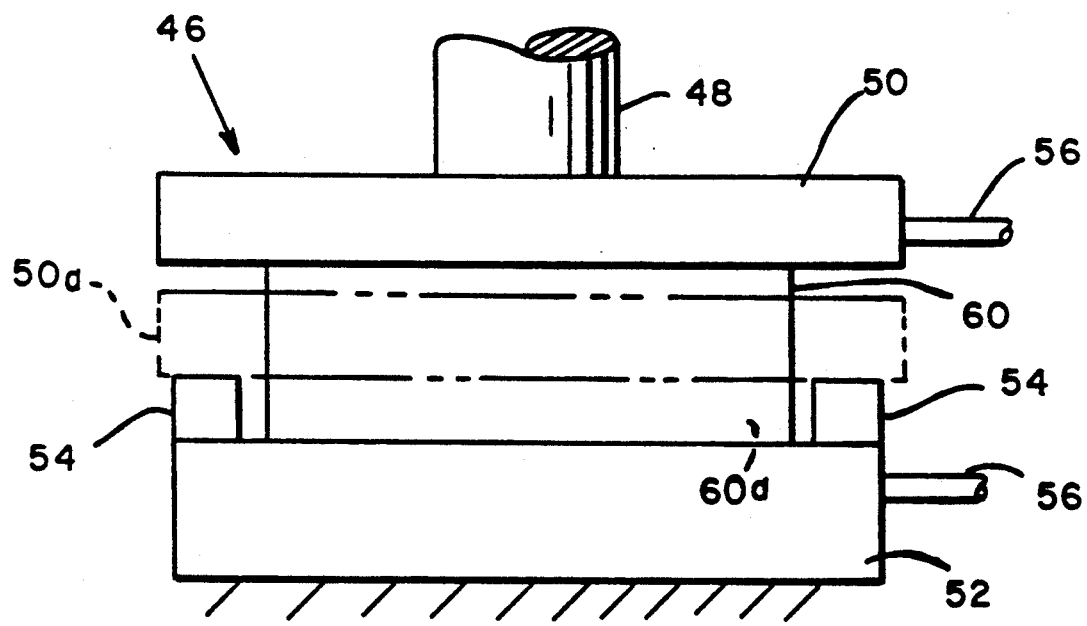
FIG. 4 is a cross sectioned view of a portion of an apparatus used to felt foam materials.

The inking member 12 of the instant invention was made in the following manner. To achieve the right balance between resilience, conformance and re-inking ability, the polychloroprene latex foam layer 42 was felted 2:1. Since felting had not been performed on this type of material previously, felting conditions were developed using a high temperature press shown generally at 46, available from Pasadena Hydraulics Inc., Model No. 950R18122S. The essential elements of a high temperature press is shown in FIG. 4 and includes an upper movable platen 50 which is attached to a piston 48 and a lower stationary platen 52. A source of heat 56 is provided in the form of resistive heating to heat the platens 50, 52 with foam material 60 to be felted located between the upper platen 50 and lower platen 52. A shim 54 is shown located on the lower platen 52. A number of important parameters had to be considered when determining processing conditions and feasibility of felting. Included in the variables were initial foam thickness, shim 54 thickness for control of pressure, felting ratio, initial density, press temperature and time. A foam of an initial thickness 60 was placed in the press and shims selected that would achieve the final felting ratio. Pressure was applied to the foam 60 with the initial thickness until contact was made between the upper platen 50 and the shim 54 resulting in the foam of reduced volume 62. For example, for a felting ratio of 2:1 and a finished polychloroprene thickness of 0.145", a press temperature of 400°-425° F., a time of 5-10 minutes, shim thickness of 0.15-0.140" and a pressure between 11,000 and 13,000 lbs/in$^2$, with a foam starting thickness of 0.29" was found advantageous. For higher felting ratios, higher press temperatures or pre-heating are useful, but it should be noted that volume reduction in paramount in determining the degree of felting. Shim thickness depends on the desired felting ratio as well as final pad thickness. The amount of felting achieved is proportional to the reduction of volume of the foam 60. If a 2:1 felting ratio is desired, the foam 60 originally placed in the press 46 will have its volume reduced by one half with heat applied for the periods above given. The felting of the polychloroprene open celled foam materials directly reduced the effect of pore size as well as increased the compression strength of the elastomeric foam material. As printing tests subsequently showed, by felting the bottom layer 42, the inking member 12 conformance was improved along with compressibility and ink pooling.

Once a felted layer 42 of the proper dimension was produced, the same was laminated to the second layer 44. The goal of lamination is to assure intimate contact between the top layer 44 and the bottom layer 42 without impeding ink flow. Thus, an open web type of material was chosen. For example, a polyamide adhesive can be used to heat laminate the polychloroprene latex felted layer 42 to the polyethylene layer 44. A press temperature of 248° F. for a period of 3 minutes using appropriate shims is effective for lamination. The temperature for laminating can vary from 220° to 270° F. and the time can vary from 2 to 4 minutes and the pressure can vary between 4,500 and 5,500 lbs/in$^2$.

An inking member having a top layer 44 made of polyethylene foam, a bottom layer of porous polychloroprene latex foam and a fusible web adhesive for connecting the two has been shown to be quite advantageous. As opposed to prior materials, such as those discussed in U.S. Pat. No. 4,945,831, superior inking properties were achieved with solution inks. The inking member 12 of the instant invention resulted in an estimated operating life of 1 to 2 years and a printing life cycle of 500,000 to one million when used with a solution ink. With a foam inking member made of polychloroprene, the volume of swell was found to be 1% as opposed to 5.9% for prior materials. In addition superior print quality was achieved that directly correlates to the smoothness of the surface of the top layer 44 in which pore size is a factor. The smooth top surface provides excellent undistorted ink transfer to the printing plate it contacts for subsequent transfer of ink to paper. In addition, for the purpose of constant print intensity over continuous printing cycles, a dual layer composite must be used which combines a small pore size metering surface 44 and an open pore size storage layer 42 for long term continuous printing. The is accomplished with the instant invention.

What is claimed is:

1. In a method of making a rechargeable inking member, the steps comprising:
    a) producing a first inking layer by placing a layer of open cell polychloroprene latex foam in a press,
    b) the first inking layer by reducing the volume of the first inking layer and subjecting it to a pressure of 11,000 to 13,000 lb/in$^2$, and heating the first inking layer to a temperature of 400°-425° F. for 5 to 10 minutes,
    c) removing the first inking layer from the press, and
    d) attaching the first inking layer to a second inking layer.

2. The method of claim 1 wherein the step of attaching the first layer to the second layer is by applying a polyamide between the first and second layers and heating at a temperature of 220° to 270° F. for a period of 2 to 4 minutes under a pressure of 4,500 to 5,500 lb/in$^2$.

* * * * *